(12) United States Patent
Westermann (10) Patent No.: US 9,383,040 B2
(45) Date of Patent: Jul. 5, 2016

(54) SHELL COUPLING AND USE THEREOF

(75) Inventor: Karl Westermann, Walddorfhaeslach (DE)

(73) Assignee: Putzmeister Engineering GmbH, Aichtal (DE)

(*) Notice: Subject to any disclaimer, the term of this patent is extended or adjusted under 35 U.S.C. 154(b) by 252 days.

(21) Appl. No.: 14/114,971

(22) PCT Filed: May 30, 2012

(86) PCT No.: PCT/EP2012/060113
§ 371 (c)(1),
(2), (4) Date: Oct. 31, 2013

(87) PCT Pub. No.: WO2012/168119
PCT Pub. Date: Dec. 13, 2012

(65) Prior Publication Data
US 2014/0076420 A1    Mar. 20, 2014

(30) Foreign Application Priority Data

Jun. 10, 2011 (DE) .......................... 10 2011 077 346

(51) Int. Cl.
*F16L 3/10* (2006.01)
*E04G 21/04* (2006.01)

(52) U.S. Cl.
CPC . *F16L 3/10* (2013.01); *E04G 21/04* (2013.01); *E04G 21/0427* (2013.01); *E04G 21/0445* (2013.01); *F16L 3/1075* (2013.01); *Y10T 137/6881* (2015.04); *Y10T 137/8807* (2015.04)

(58) Field of Classification Search
USPC ........ 137/351, 355.12, 899; 417/900; 285/61, 285/62, 64, 365, 409, 410, 411; 248/65, 73, 248/74.1, 68.1; 411/339
See application file for complete search history.

(56) References Cited

U.S. PATENT DOCUMENTS 646,738 A  *  4/1900  Ingalls ..................... F16B 21/06
                                                             24/107

(Continued)

FOREIGN PATENT DOCUMENTS

DE   30 13 450 A1   10/1981
DE   30 44 795 A1    7/1982
(Continued)

OTHER PUBLICATIONS

International Search Report of PCT/EP2012/060113, mailed Jan. 2, 2013.

(Continued)

*Primary Examiner* — Kevin Murphy
*Assistant Examiner* — Jonathan Waddy
(74) *Attorney, Agent, or Firm* — Collard & Roe, P.C.

(57) ABSTRACT

The invention relates to a shell coupling (40) for coupling pairs of pipes, having two half-shells (46, 48') which, in the coupling state, bound a circular opening (60) for through-passage of the pipes and, at their one end, can be pivoted in relation to one another, via an outer articulation (44), about an articulation axis-parallel to the circular opening (60) and, at their other end, can be connected to one another in a releasable manner via a clamping mechanism (51), with the pipes which are to be coupled being clamped in the process. In order to reinforce the pipe connection to the concrete placing boom, and to improve the force transmission which is necessary in this region, it is proposed, according to the invention, that the shell coupling (40), which is designed as an add-on coupling, has a mounting plate (52) which has a retaining structure (54) by means of which at least one force-transmission element (50) formed on one of the half-shells (48') is accommodated in a form-fitting and force-fitting manner. The at least one force-transmission element (50) here expediently has a cross-sectionally wedge-shaped contour, the retaining structure (54) forming at least one wedge mount (56), wherein the mounting plate (52) and the one half-shell (48') can be connected to one another by means of at least one clamping screw (66), with the force fit being made in the process in the wedging direction of the force-transmission element (50) and of the retaining structure (54).

10 Claims, 9 Drawing Sheets

(56) References Cited

U.S. PATENT DOCUMENTS

| | | | | |
|---|---|---|---|---|
| 2,425,033 A | * | 8/1947 | Fletcher | F16L 3/227 248/68.1 |
| 2,765,136 A | * | 10/1956 | Knapp | F16L 3/227 248/246 |
| 3,271,058 A | * | 9/1966 | Anderson | F16B 5/02 403/408.1 |
| 3,707,990 A | * | 1/1973 | Schaible | B60P 1/36 137/615 |
| 6,106,189 A | * | 8/2000 | Seale | F16B 7/0493 248/230.3 |
| 6,402,096 B1 | * | 6/2002 | Ismert | F16L 3/221 24/271 |
| 7,861,982 B1 | | 1/2011 | McClure | |
| 2006/0006292 A1 | | 1/2006 | Kleeb et al. | |
| 2008/0219822 A1 | * | 9/2008 | Funk | E04G 21/04 414/495 |
| 2011/0186693 A1 | * | 8/2011 | McMiles | F16L 3/08 248/65 |

FOREIGN PATENT DOCUMENTS

| | | |
|---|---|---|
| DE | 93 05 667 U1 | 6/1993 |
| DE | 94 03 872 U1 | 5/1994 |
| DE | 43 18 831 C2 | 12/1994 |
| EP | 1 209 397 A1 | 5/2002 |
| GB | 1 388 959 A | 4/1975 |
| WO | 2004/029492 A1 | 4/2004 |

OTHER PUBLICATIONS

German Search Report in DE 10 2011 077 346.0, dated May 8, 2012, with English translation of relevant parts.

\* cited by examiner

SHELL COUPLING AND USE THEREOF

CROSS REFERENCE TO RELATED APPLICATIONS

This application is the National Stage of PCT/EP2012/060113 filed on May 30, 2012, which claims priority under 35 U.S.C. §119 of German Application No. 10 2011 077 346.0 filed on Jun. 10, 2011, the disclosure of which is incorporated by reference. The international application under PCT article 21(2) was not published in English.

The invention relates to a shell coupling for coupling pairs of pipes, having two half-shells which, in the coupled state, bound a circular opening for the through-passage of the pipes and, at their one end, can be pivoted in relation to one another, via an outer articulation, about an articulation axis axis-parallel to the circular opening and, at their other end, can be connected to one another in a releasable manner via a tensioning mechanism, with the pipes which are to be coupled being clamped in the process.

Shell couplings of this type are used as pipe couplings, for example, in concrete-delivery lines. In the case of a delivery line which is guided via a concrete-distributing boom, the pipes may be designed, for example, as pipe segments, pipe bends or pipe elbows. The pipe segments of the delivery line here are guided along the outside of the arms of a folding boom and fixed on the boom arms by means of pipe holders. The pipe segments are connected to one another in an articulated manner as they progress via pipe bends and rotary pipe connections. In the case of the pipework of concrete-distributing booms, it may be necessary, depending on the pipework concept, for the delivery line to be fixed in position at the one end of a boom arm. For this purpose, it is known for a pipe coupling designed as an add-on coupling to be fixed on a pipe holder between the two pipe bends executing an articulated movement and, at the same time, orthogonally to this, for the first pipe segment following the articulated coupling to be secured, by way of a bracket or tensioning strap behind its entry collar, on the adjacent boom arm. This comparatively complex design is necessary because the known add-on couplings are not suitable for absorbing, at their fastening foot, relatively large forces in the axial direction of the pipe, that is to say transversely to the coupling. This construction, in addition, has the disadvantage that forces which act along the pipe segment are introduced into the add-on coupling provided therefor via the lever arm of the pipe-bend gauge. Moreover, using a bracket or tensioning strap as a clamping element makes it possible for the pipe segment to be damaged at the clamping-in location.

Proceeding from this, it is an object of the invention to improve a shell coupling of the type indicated in the introduction to the extent that the shell coupling is designed as an easy-to-mount add-on coupling with improved force-transmission properties.

The combination of features indicated in patent claim 1 is proposed in order to achieve this object. Advantageous configurations and developments of the invention can be gathered from the dependent claims.

The solution according to the invention is based on the concept of the shell coupling having a mounting plate, which has a retaining structure by means of which at least one force-transmission element formed on one of the half-shells is accommodated in a form-fitting and force-fitting manner. The mounting plate here serves for fastening the shell coupling in the manner of an add-on coupling on the counter-plate of a pipe holder, which will be described in more detail hereinbelow.

According to a preferred configuration of the invention, the at least one force-transmission element has a cross-sectionally wedge-shape contour, whereas the retaining structure forms at least one wedge mount, wherein the mounting plate and the associated half-shell can be connected to one another by means of at least one clamping screw, with the force fit being made in the process in the wedging direction of the at least one force-transmission element and of the retaining structure. These measures establish, between the mounting plate and the shell coupling, a clamping connection which is reinforced in the longitudinal direction of the pipes and ensures that forces flow in a play-free manner from the shell coupling into the mounting plate.

According to a further preferred configuration of the invention, the one half-shell has two cross-sectionally wedge-shaped force-transmission elements, which are spaced apart from one another in the circumferential direction of the wedge opening, whereas the retaining structure has two spaced-apart wedge mounts, which are adapted to the wedge-shaped contour of the force-transmission elements. It is possible here for the force-transmission elements to have an outwardly converging wedge-shaped cross section and for the wedge mounts to have an outwardly diverging wedge-shaped cross section.

According to a further advantageous configuration of the invention, the retaining structure is formed by four triangular or trapezoidal supporting blocks which project on the mounting plate, essentially vertically above the plane thereof, and of which two each are paired adjacent to one another and have their edge surfaces which are directed toward one another bounding the wedge-shaped mount for one of the force-transmission elements. The two supporting pairs here are expediently spaced apart from one another tangentially to the circular opening.

A preferred configuration of the invention provides that the one half-shell is arranged between the two supporting-block pairs with self-centering action tangentially to the circular opening. This is achieved, for example, in that the force-transmission elements and the retaining structure, in the region of their wedge surfaces, each have an oppositely oriented self-centering slope tangentially to the circular opening.

A further advantageous configuration of the invention provides that the mounting plate, and its retaining structure, is designed as a single-piece casting or forging. It is also possible for the mounting plate to have two spaced-apart through-holes and for the one half-shell, in the region of the force-transmission elements, to have two threaded bores which are spaced apart by the same distance as the through-holes and are intended for the clamping screws. To help with self-centering, the through-holes are oversized in relation to the threaded bores.

A further preferred configuration of the invention provides that the force-transmission elements of the one half-shell, in the state in which they are joined without force being applied, have their wedge tip spaced apart from the mounting plate, and that the mounting plate can be flexed elastically by virtue of the clamping screws being tightened, with the force fit being formed in the process, until abutment of the wedge tips takes place, with simultaneous self-centering of the mounting plate in relation to the half-shell.

A preferred use of the shell coupling according to the invention resides in the coupling of pipe bends and pipe segments arranged on a folding boom of a concrete pump, wherein the mounting plate is screwed or welded to a counter-plate, which is connected rigidly to a pipe holder of a folding arm.

The invention also relates to a stationary or mobile concrete pump having a folding boom, having a delivery line, which is assembled from pipe segments and pipe bends and is guided via the folding boom, and having pipe holders for the delivery line, said holders being arranged on the arms of the folding boom, wherein shell couplings of the type according to the invention are provided for connecting pipes of the delivery line, said shell couplings being connected to associated pipe holders via their mounting plate. For this purpose, a counter-plate is expediently arranged rigidly on the pipe holders, the mounting plate of the shell coupling being screwed or welded on said counter-plate.

The invention will be explained in more detail hereinbelow with reference to an exemplary embodiment illustrated schematically in the drawing, in which.

Figure 1:
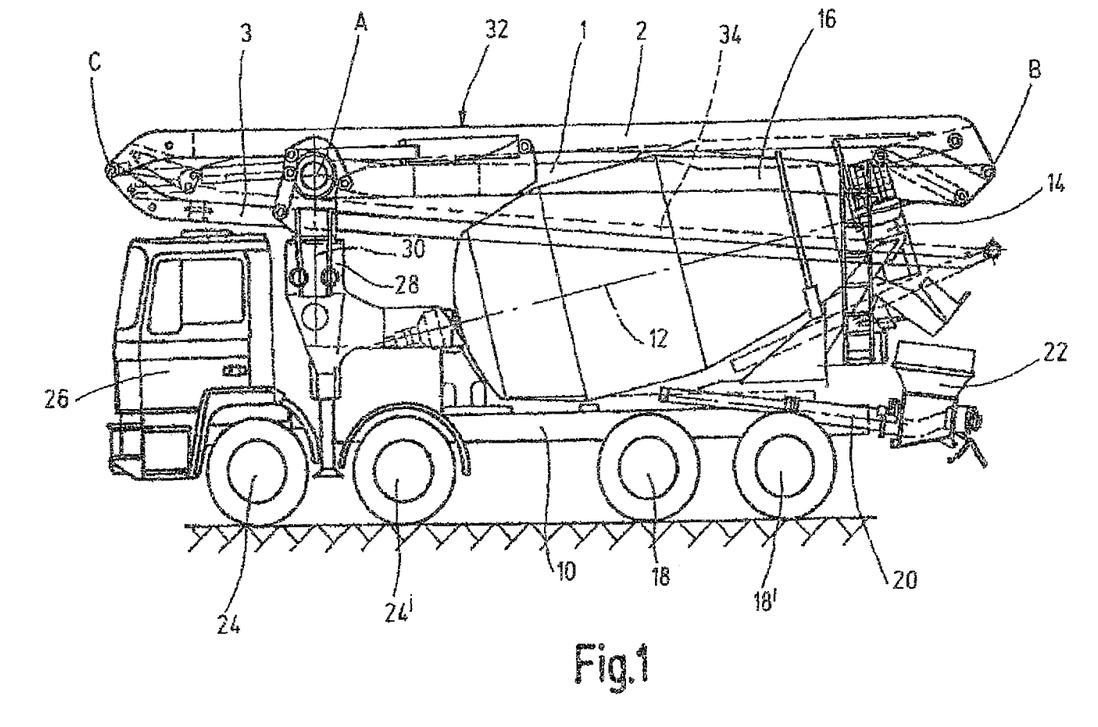
FIG. 1 shows a side view of a truck mixer pump with concrete-distributing boom.
Figure 2A:
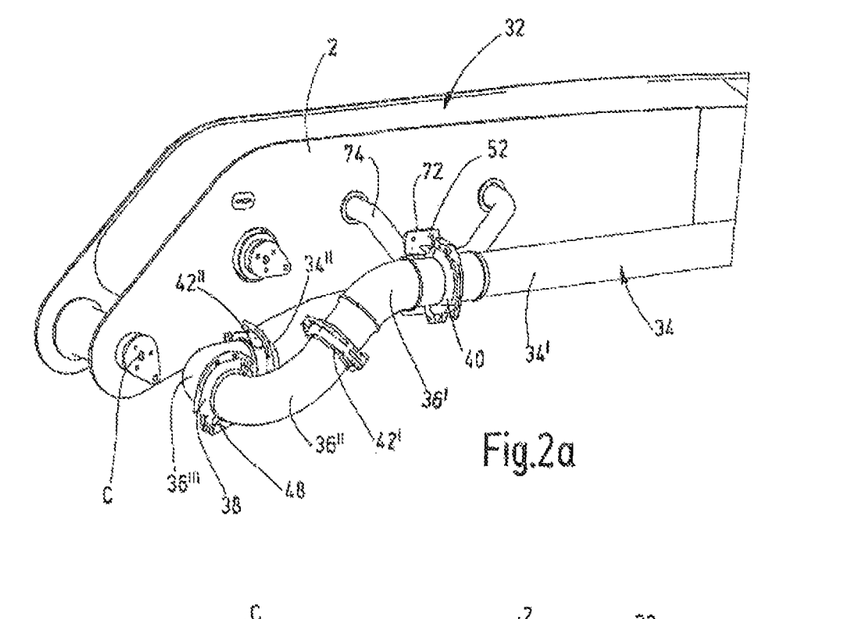
FIGS. 2a to d show detail-form illustrations, on an enlarged scale, of various views of a distributing boom with a delivery line, assembled from pipe segments and pipe bends, in the region of one of the folding axes.
Figure 2B:
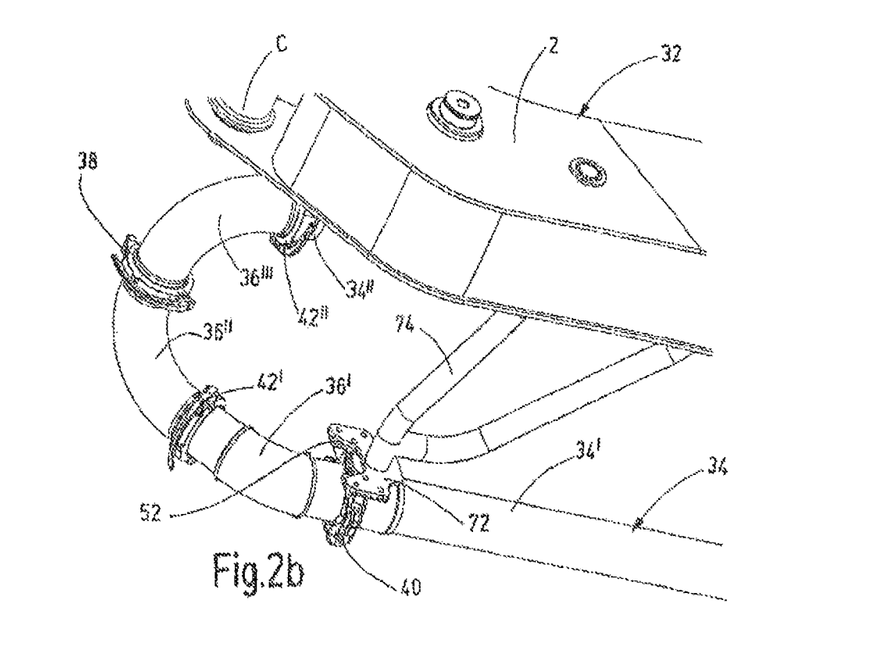
Figure 2C:
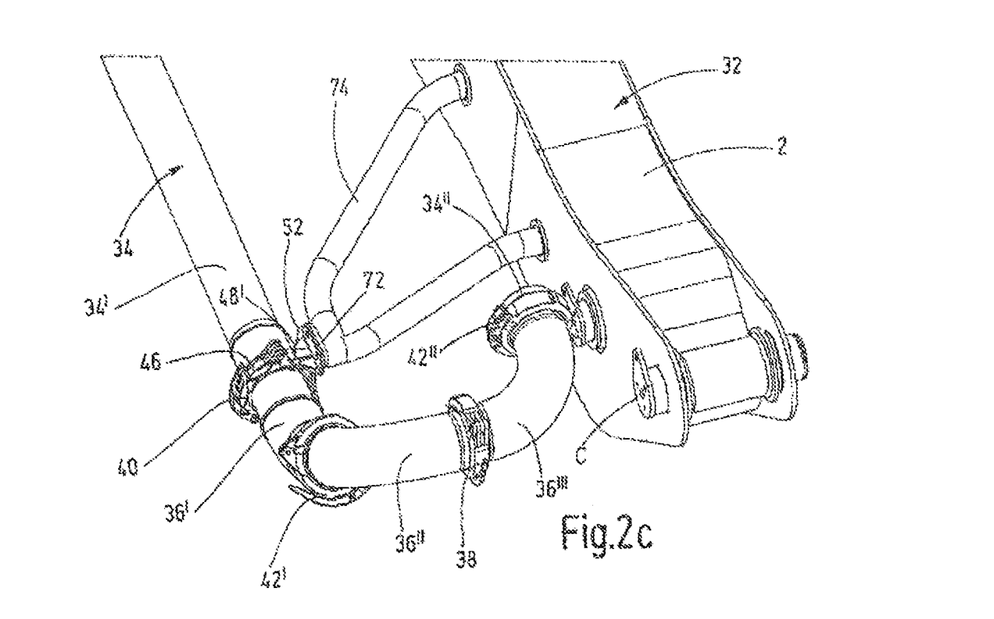
Figure 2D:
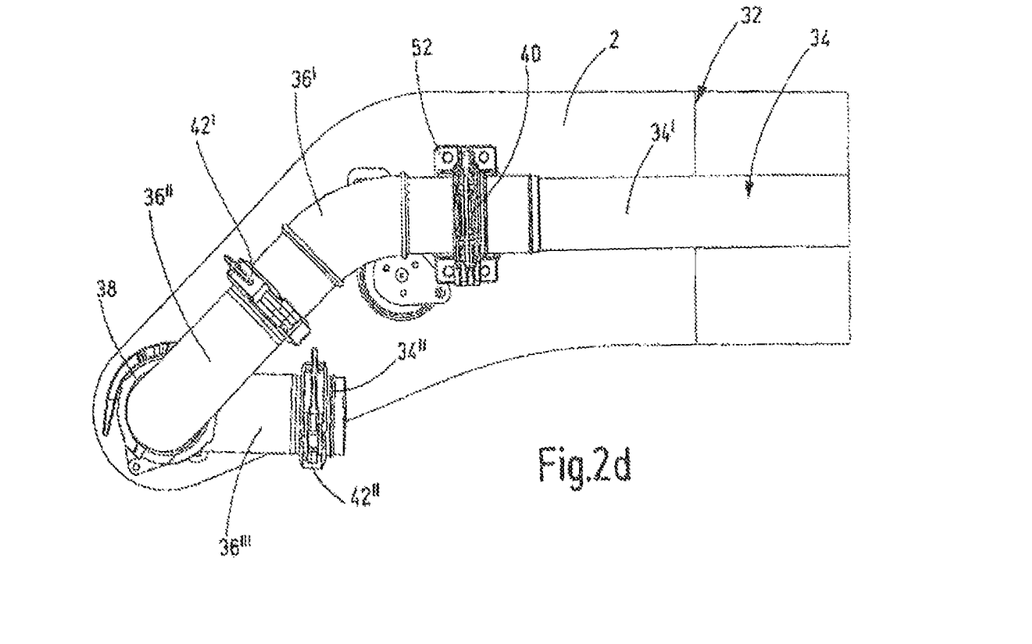
Figure 3A:
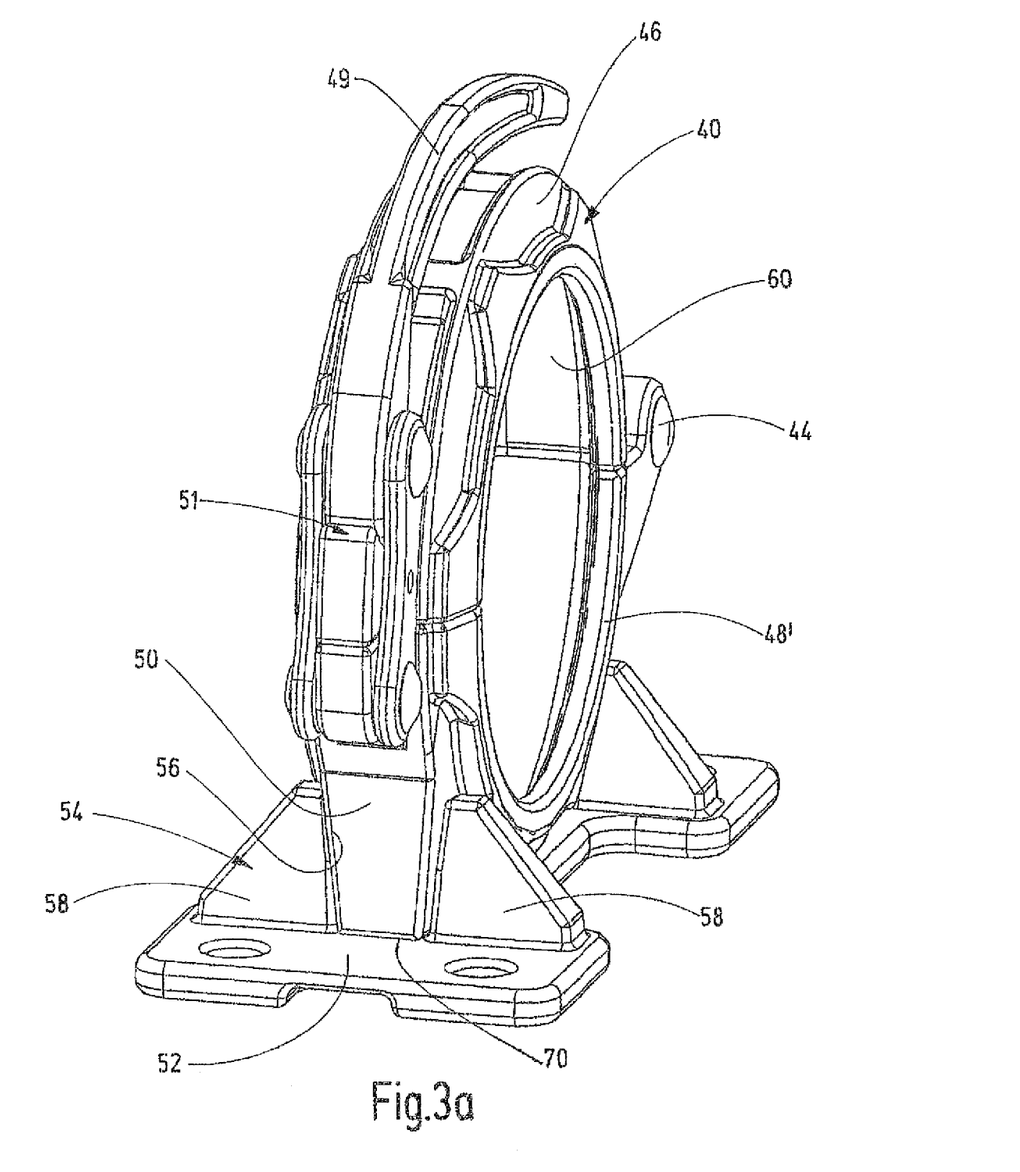
FIGS. 3a to f show a shell coupling designed as an add-on coupling in a diagrammatic illustration, in the axial direction of the circular opening, in the plan view, in two different side views and in a bottom view.
Figure 3B:
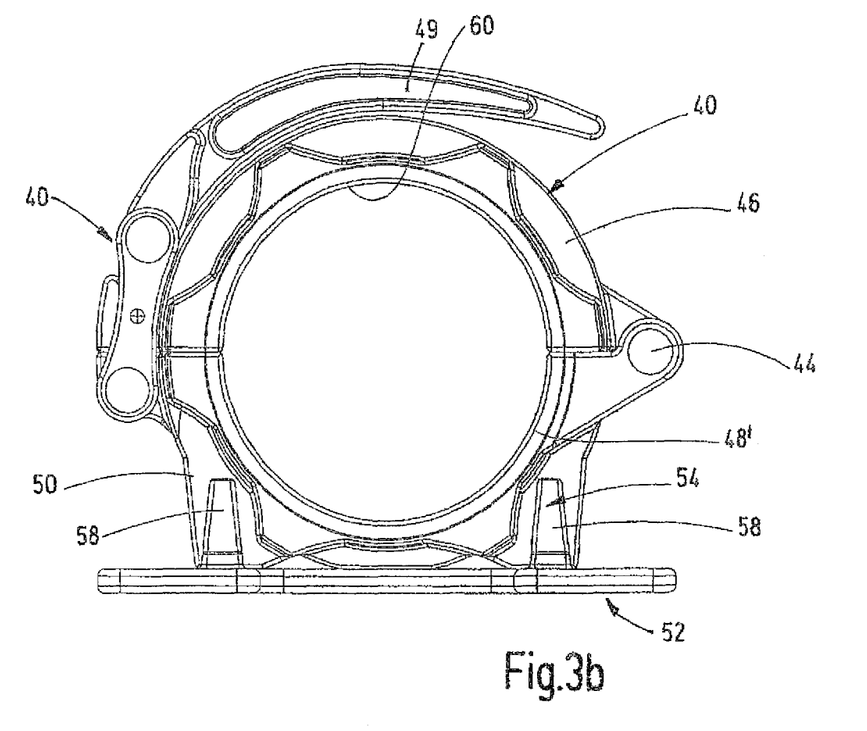
Figure 3C:
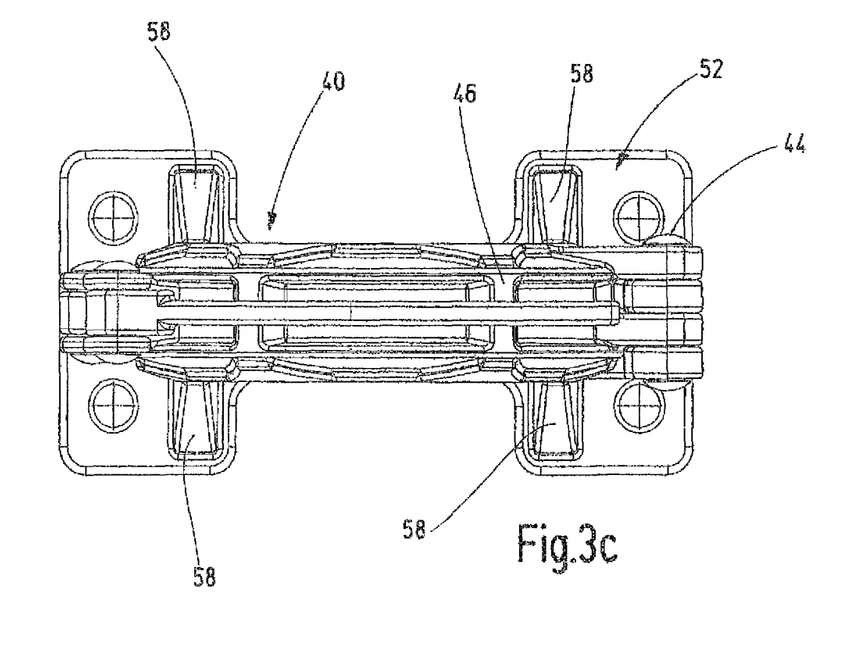
Figure 3D:
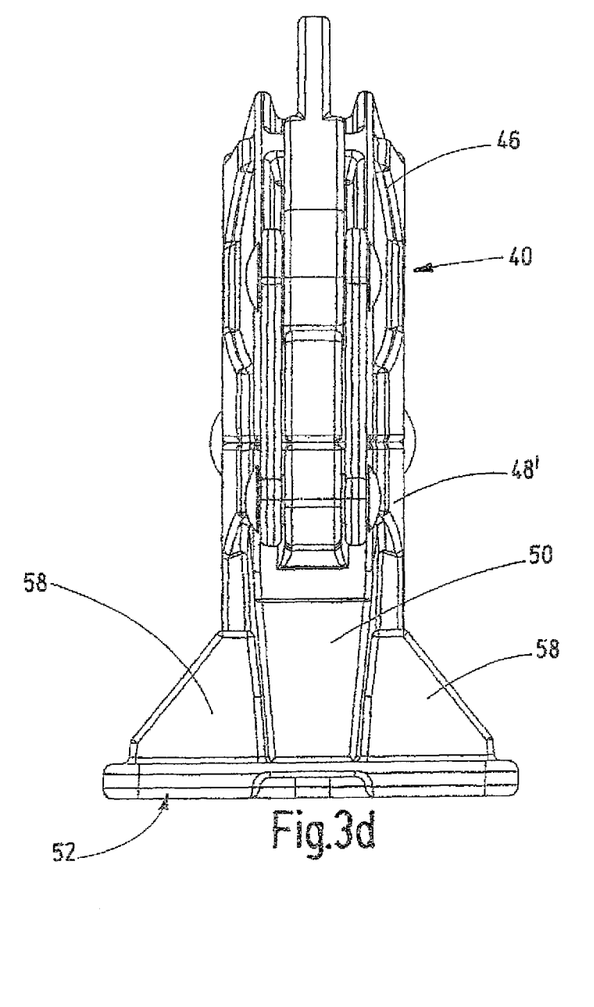
Figure 3E:
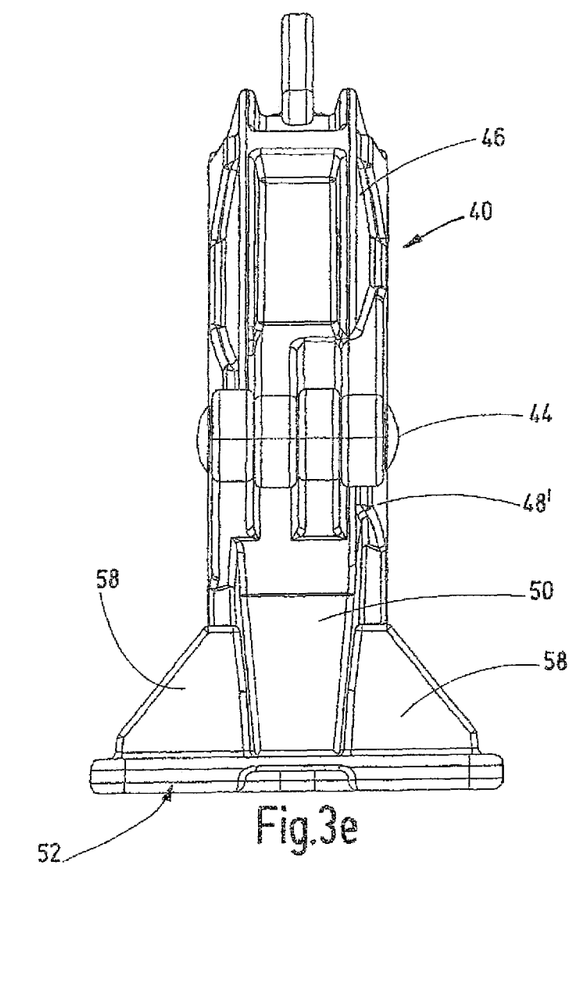
Figure 3F:
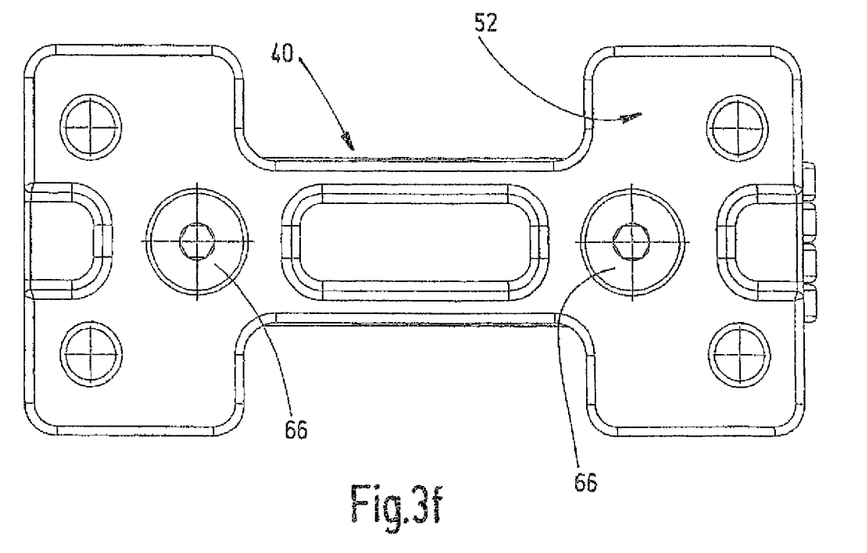
Figure 4:
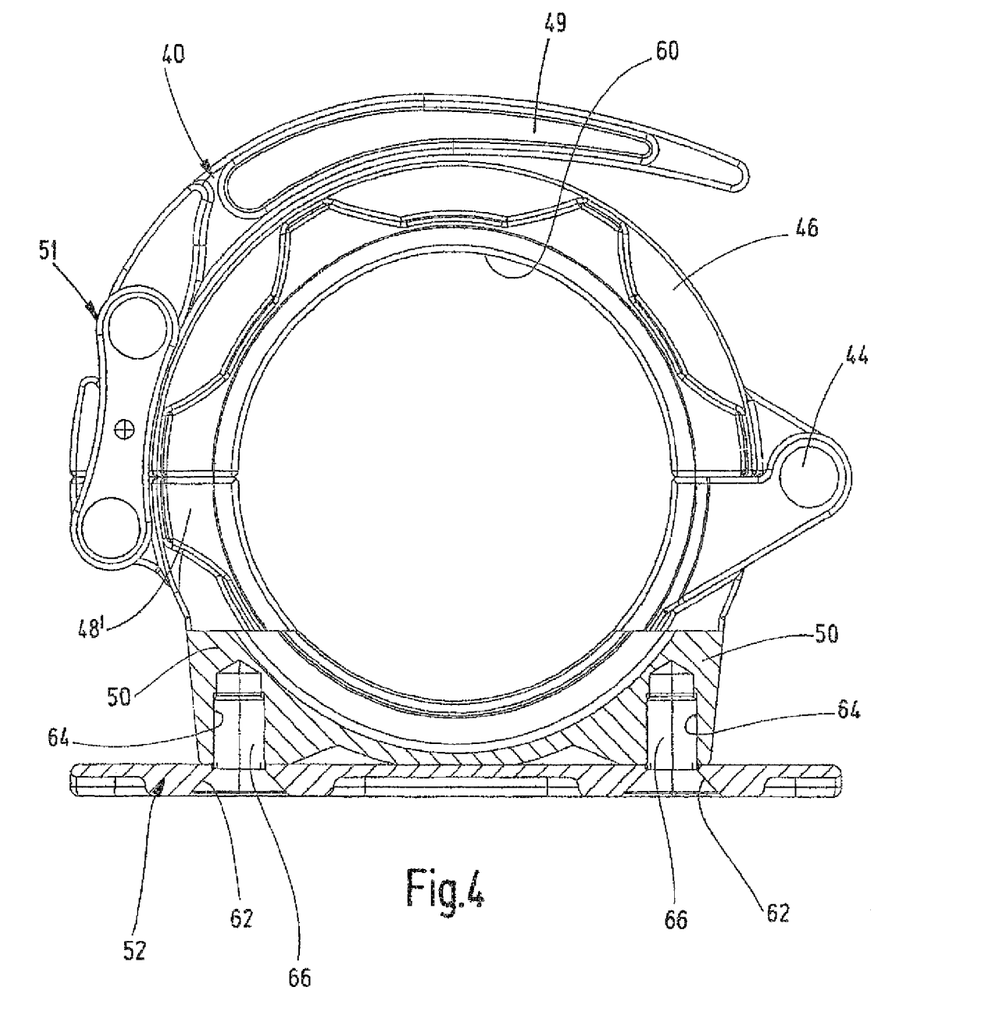
FIG. 4 shows a side view, partly in section, corresponding to FIG. 3b.
Figures 5A, 5B:
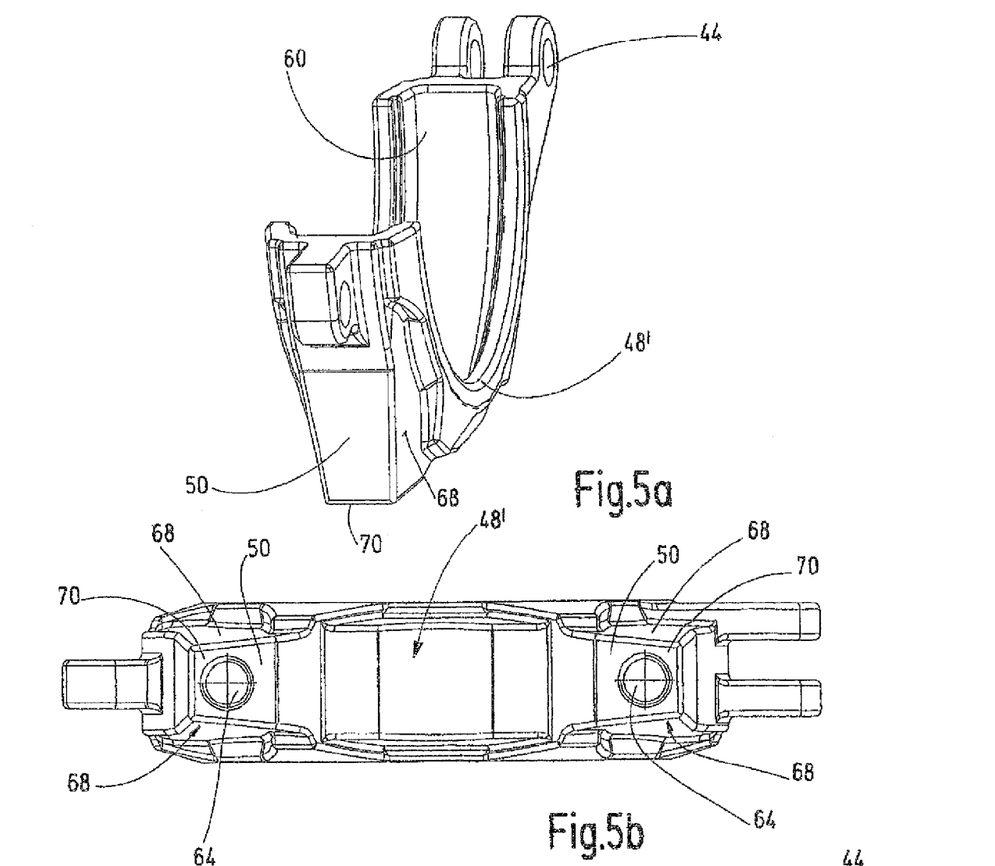
FIGS. 5a to c show one of the half-shells of the shell coupling with force-transmission elements in a diagrammatic illustration, in a bottom view and in a side view.
Figure 5C:
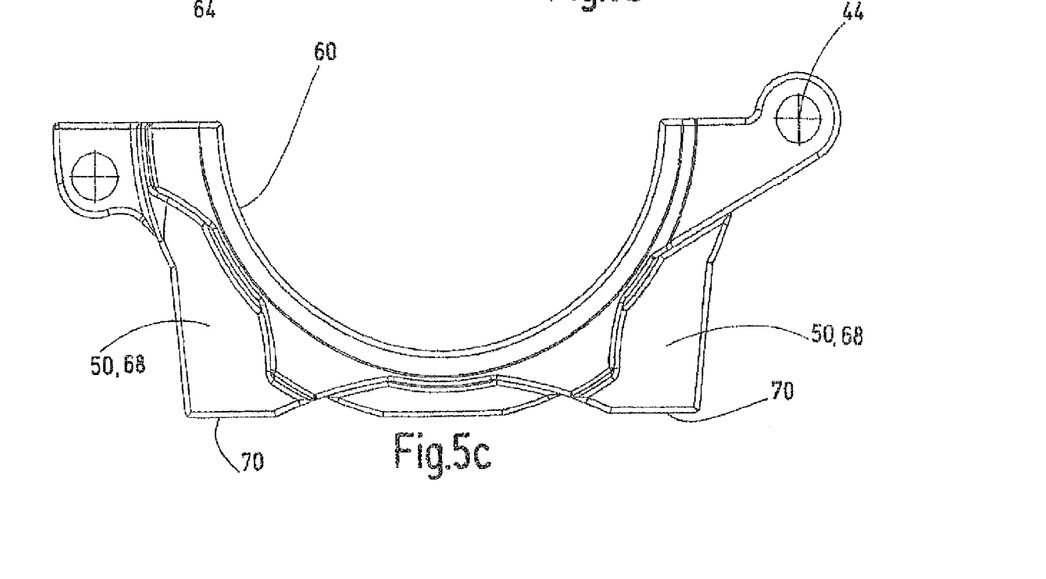
Figure 6:
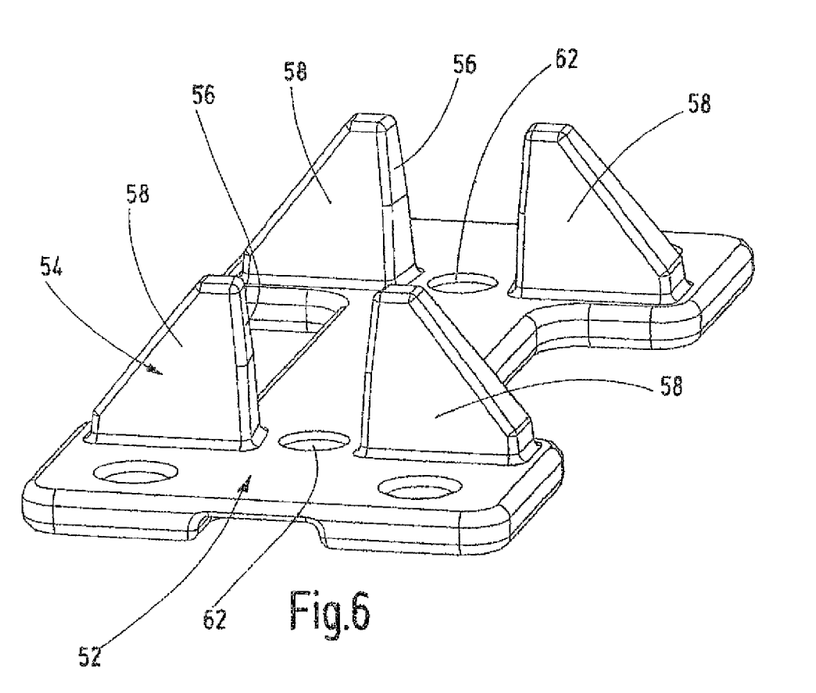
FIG. 6 shows a diagrammatic illustration of the mounting plate of the shell coupling.

The truck mixer pump illustrated in FIG. 1 essentially comprises a four-axle bogie 10, a mixing drum 16, which is arranged for rotation about the axis 12 in the central region of the bogie 10 and has its charging and outlet opening 14 oriented obliquely to the rear, a two-cylinder thick-matter pump 20, which is arranged on the bogie 10 in the region of the rear axles 18, 18' and has a material-supply container 22, and in addition a concrete-distributing boom 32, which is mounted for rotation about a vertical axis 30 on a bearing block 28 in the region of the front axles 24, 24', in the vicinity of the driver's cab 26, is assembled from three boom arms 1, 2, 3, which can be pivoted in relation to one another at folding articulations A, B and C, and carries a concrete-delivery line 34. The concrete-delivery line 34 is assembled from a plurality of pipe segments 34', 34", which are connected to one another via pipe bends 36', 36", 36''' at the articulated ends of the boom arms 1, 2, 3. For this purpose, the pipe segments 34, 34' and the pipe bends 36', 36", 36''' each have a radially projecting coupling flange (not illustrated in the drawing) at their ends which are directed toward one another. Shell couplings 38, 40, 42', 42" are provided in order to establish a pipe connection, of which the shell coupling 38 is designed as a rotary pipe connection with an axis of rotation parallel to the folding axis C, whereas the shell coupling 40 is designed as an add-on coupling and the shell couplings 42', 42" are designed as standard couplings. The shell couplings of the rotary pipe connection 38, of the add-on coupling 40 and of the standard couplings 42', 42" each comprise two cross-sectionally U-shaped half-shells 46, 48, 48' which are connected to one another at an articulation 44, can be positioned on the flange parts (not illustrated) and can be braced against the same by a respective tensioning mechanism 51 having a lever 49. In the case of the add-on coupling 40 and of the standard couplings 42', 42", the connection takes place in a form-fitting and force-fitting manner, whereas, in the case of the rotary pipe connection 38, the connection takes place only in a form-fitting manner, rotation about the axis C therefore still being possible. Sealing rings (not illustrated), which ensure a liquid-tight connection, are located between the flange parts held together by the half-shells 46 and 48, 48'.

One special feature is constituted by the add-on coupling 40, of which the half-shell 48' carries two force-transmission elements 50 and a mounting plate 52, which is positioned on the force-transmission elements 50. The force-transmission elements 50 having a wedge-shaped contour in cross section are formed on a half-shell 48', whereas the mounting plate 52 is designed as a separate part and has a retaining structure 54 by means of which the force-transmission elements 50 are accommodated in a form-fitting and force-fitting manner. In the case of the exemplary embodiment shown, the retaining structure 54 has two spaced-apart wedge mounts 56, which are adapted to the wedge-shaped contour of the force-transmission elements 50, wherein the wedge mounts 56 have an outwardly diverging wedge-shaped cross section and the force-transmission elements 50 have an outwardly converging wedge-shaped cross section. The retaining structure 54 is formed by four triangular or trapezoidal supporting blocks 58 which project on the mounting plate 52, essentially vertically above the plane thereof, and of which two each are paired adjacent to one another and have their edge surfaces which are directed toward one another bounding one of the wedge mounts 56. The mounting plate 52 and the half-shell 48' can be connected to one another by means of a respective clamping screw 66, with the force fit being made in the process in the wedging direction of the force-transmission elements 50 and of the retaining structure 54. For this purpose, the mounting plate has two spaced-apart through-holes 62 and the half-shell 48', in the region of the force-transmission elements 50, has two threaded bores 64 which are spaced apart by the same distance as the through-holes 62 and are intended for the clamping screws 66. A further special feature resides in the fact that the half-shell 48' has its force-transmission elements 50 arranged between the two supporting-block pairs 58 with self-centering action tangentially to the circular opening 60. This is achieved by the force-transmission elements 50 each having an oppositely oriented self-centering slope 68 tangentially to the circular opening. In order to make possible the form-fitting and force-fitting bracing between the half-shell 48' and the mounting plate 52, the force-transmission elements of the half-shell 48', in the state in which they are joined without force being applied, have their wedge tip 70 spaced apart from the mounting plate 52, whereas the mounting plate 52 can be flexed elastically by virtue of the clamping screws 66 being tightened, with the force fit being formed in the process, until abutment of the wedge tips 70 takes place.

In the case of the exemplary embodiment shown, the shell coupling 40 designed as an add-on coupling is used for coupling pipe bends 36', 36", 36''' and pipe segments 34', 34" arranged on the concrete-distributing boom 32 of the concrete pump, wherein the mounting plate 52 is screwed to a counter-plate 72, which is connected rigidly to a pipe holder 74 of a boom arm. The pipe holder 74 is arranged or welded on the boom arm 2 so as to serve as a genuine fixed bearing for the delivery line 34. The shell coupling 40, which is screwed on the counter-plate 72 via the mounting plate, absorbs the transverse forces occurring in the direction of the delivery line 34 and transmits the same to the pipe holder 74 such that there is no need for any additional transverse holder. This straightforwardly achieves a pipe-retaining means which allows for reliable force transmission in the pivoting region of the concrete-distributing boom 32 and the delivery line 34.

In summary: The invention relates to a shell coupling 40 for coupling pairs of pipes, having two half-shells 46, 48' which, in the coupled state, bound a circular opening 60 for the through-passage of the pipes and, at their one end, can be pivoted in relation to one another, via an outer articulation 44, about an articulation axis axis-parallel to the circular opening 60 and, at their other end, can be connected to one another in a releasable manner via a tensioning mechanism 51, with the pipes which are to be coupled being clamped in the process. In order to reinforce the pipe connection to the concrete-distributing boom, and to improve the force transmission which is necessary in this region, the invention proposes that the shell coupling 40, which is designed as an add-on coupling, has a mounting plate 52, which has a retaining structure 54 by means of which at least one force-transmission element 50 formed on one of the half-shells 48' is accommodated in a form-fitting and force-fitting manner. The at least one force-transmission element 50 here expediently has a cross-sectionally wedge-shaped contour, whereas the retaining structure 54 forms at least one wedge mount 56, wherein the mounting plate 52 and the one half-shell 48' can be connected to one another by means of at least one clamping screw 66, with the force fit being made in the process in the wedging direction of the force-transmission element 50 and of the retaining structure 54.

LIST OF DESIGNATIONS

A, B, C Folding articulations
1, 2, 3 Boom arms
10 Bogie
12 Axis
14 Charging and outlet opening
16 Mixing drum
18, 18' Rear axles
20 Two-cylinder thick-matter pump
22 Material-supply container
24, 24' Front axles
26 Driver's cab
28 Bearing block
30 Vertical axis
32 Concrete-distributing boom
34 Concrete-delivery line
34', 34" Pipe segments
36', 36", 36'" Pipe bends
38, 40, 42', 42" Shell couplings
44 Articulation
46, 48, 48' Half-shells
49 Lever
50 Force-transmission element
51 Tensioning mechanism
52 Mounting plate
54 Retaining structure
56 Wedge mount
58 Supporting blocks
60 Circular opening
62 Through-holes
64 Threaded bore
66 Clamping screw
68 Self-centering slope
70 Wedge tip
72 Counter-plate
74 Pipe holder

The invention claimed is:

1. A shell coupling for coupling pairs of pipes, having two half-shells (46, 48') which, in a coupled state, bound a circular opening (60) for the through-passage of the pipes and, at one end of the half-shells, can be pivoted in relation to one another, via an outer articulation (44), about an articulation axis axis-parallel to the circular opening (60) and, at another end of the half-shells, can be connected to one another in a releasable manner via a tensioning mechanism (51), with the pipes which are to be coupled being clamped in a clamping process, comprising a mounting plate (52), which has a retaining structure (54) by means of which at least one force-transmission element (50) formed on one of the half-shells (48') is accommodated in a form-fitting and force-fitting manner, wherein the at least one force-transmission element (50) has a cross-sectionally wedge-shaped contour, wherein the retaining structure (54) forms at least one wedge mount (56), wherein the mounting plate (52) and the one half-shell (48') with the at least one force-transmission element can be connected to one another in a fitting process, with the force fit being made in the fitting process in a wedging direction of the force-transmission element (50) and of the retaining structure (54), wherein the one half-shell (48') with the at least one force-transmission element has two cross-sectionally wedge-shaped force-transmission elements (50), which are spaced apart from one another in a circumferential direction of the circular opening (60), and wherein the retaining structure (54) has two spaced-apart wedge mounts (56), which are adapted to the wedge-shaped contours of the force-transmission elements (50), and wherein the retaining structure (54) is formed by four triangular or trapezoidal supporting blocks (58) which project on the mounting plate (52), essentially vertically above a plane of the mounting plate, and of which two of each pair of supporting blocks are paired adjacent to one another and have respective edge surfaces which are directed toward one another bounding the wedge mount (56) for one of the force-transmission elements (50).

2. The shell coupling as claimed in claim 1, wherein the mounting plate (52) and the one half-shell (48') with the at least one force-transmission element can be connected by means of at least one clamping screw (66).

3. The shell coupling as claimed in claim 1, wherein the force-transmission elements (50) have an outwardly converging wedge-shaped cross section and the wedge mounts (56) have an outwardly diverging wedge-shaped cross section.

4. The shell coupling as claimed in claim 1, wherein the two supporting-block pairs (58) are spaced apart from one another tangentially to the circular opening (60).

5. The shell coupling as claimed in claim 1, wherein the one half-shell (48') with the at least one force-transmission element is arranged between the two supporting-block pairs (58) with self-centering action tangentially to the circular opening (60).

6. The shell coupling as claimed in claim 5, wherein the force-transmission elements (50) and the retaining structure (54), each have an oppositely oriented self-centering slope (68) tangentially to the circular opening (60).

7. The shell coupling as claimed in claim 1, wherein the mounting plate (52), with its retaining structure (54), is designed as a single-piece casting or forging.

8. The shell coupling as claimed in claim 1, wherein the mounting plate (52) has two spaced-apart through-holes (62) and the one half-shell (48') with the at least one force-transmission element, in the region of the force-transmission elements (50), has two threaded bores (64) which are designed spaced apart by the same distance as the through-holes (62) and are intended for clamping screws (66).

9. The shell coupling as claimed in claim 1, wherein the force-transmission elements (50) of the one half-shell (48') with the at least one force-transmission element, in the state in which the force-transmission elements are not forced into the retaining structure, have a wedge tip (70) spaced apart from the mounting plate (52), and wherein the mounting plate (52) can be flexed elastically by virtue of clamping screws (66) being tightened in the fitting process, with the force fit being formed in the fitting process, until the wedge tips (70) about a base of the mounting plate.

10. The use of the shell coupling as claimed in claim 1 for coupling delivery pipes arranged on a distributing boom (32) of a concrete pump, wherein the mounting plate is screwed or welded to a counter-plate (72), which is connected rigidly to a pipe holder (74) of a boom arm (1, 2, 3).

* * * * *